United States Patent
Zhang et al.

(10) Patent No.: US 12,052,152 B2
(45) Date of Patent: Jul. 30, 2024

(54) RECEIVING METHOD, SENDING METHOD, AND COMMUNICATIONS DEVICE

(71) Applicant: VIVO MOBILE COMMUNICATION CO., LTD., Guangdong (CN)

(72) Inventors: Yanxia Zhang, Chang'an Dongguan (CN); Xiaodong Yang, Chang'an Dongguan (CN); Qian Zheng, Chang'an Dongguan (CN)

(73) Assignee: VIVO MOBILE COMMUNICATION CO.,LTD., Guangdong (CN)

( * ) Notice: Subject to any disclaimer, the term of this patent is extended or adjusted under 35 U.S.C. 154(b) by 77 days.

(21) Appl. No.: 17/039,257

(22) Filed: Sep. 30, 2020

(65) Prior Publication Data
US 2021/0021496 A1    Jan. 21, 2021

Related U.S. Application Data

(63) Continuation of application No. PCT/CN2019/077799, filed on Mar. 12, 2019.

(30) Foreign Application Priority Data

Mar. 30, 2018    (CN) .......................... 201810276861.0

(51) Int. Cl.
*H04L 43/08*    (2022.01)
*H04L 1/1812*    (2023.01)
*H04L 1/1829*    (2023.01)
*H04W 4/40*    (2018.01)
*H04W 4/44*    (2018.01)

(52) U.S. Cl.
CPC ............ *H04L 43/08* (2013.01); *H04L 1/1812* (2013.01); *H04L 1/1841* (2013.01); *H04W 4/40* (2018.02); *H04W 4/44* (2018.02)

(58) Field of Classification Search
None
See application file for complete search history.

(56) References Cited

U.S. PATENT DOCUMENTS

| | | | |
|---|---|---|---|
| 2013/0242859 A1 | 9/2013 | Celik et al. | |
| 2015/0305012 A1* | 10/2015 | Yi | H04W 76/14 370/329 |
| 2016/0128093 A1* | 5/2016 | Lee | H04W 72/14 370/329 |
| 2017/0272384 A1 | 9/2017 | Lee et al. | |

(Continued)

FOREIGN PATENT DOCUMENTS

| | | | |
|---|---|---|---|
| CN | 104272796 A | 1/2015 | |
| EP | 2640120 A1 | 9/2013 | |
| EP | 3113559 A1 * | 1/2017 | ........... H04L 1/1822 |

OTHER PUBLICATIONS

CN Office Action in Application No. 201810276861.0 dated Apr. 2, 2020.

(Continued)

*Primary Examiner* — Jay L Vogel
(74) *Attorney, Agent, or Firm* — Price Heneveld, LLP

(57) ABSTRACT

A receiving method, a sending method and communications device are provided. The receiving method includes: obtaining a duplication detection parameter; and performing duplication detection on a received sidelink packet data convergence protocol PDCP protocol data unit PDU by using the duplication detection parameter.

6 Claims, 3 Drawing Sheets

Obtain a duplication detection parameter — 101

Perform duplication detection on a received sidelink PDCP PDU by using the duplication detection parameter — 102

(56) References Cited

U.S. PATENT DOCUMENTS

| | | | |
|---|---|---|---|
| 2018/0368132 A1* | 12/2018 | Babaei | H04L 1/1819 |
| 2019/0215685 A1* | 7/2019 | Wang | H04W 80/08 |
| 2019/0215902 A1* | 7/2019 | Tang | H04L 1/1848 |
| 2020/0275303 A1* | 8/2020 | Mok | H04W 28/0268 |
| 2020/0329352 A1* | 10/2020 | Wang | H04L 1/0003 |

OTHER PUBLICATIONS

"Packet duplication indication for PC5" 3GPP TSG-RAN WG2 Meeting#101, R2-1802005, Feb. 2, 2018.

"Packet Duplication for the Sidelink Carrier Aggregation" 3GPP TSG-RANWG2 Meeting #101, R2-1802599, Feb. 26, 2018.

"Packet duplication detection in sidelink PDCP" 3GPP TSG-RAN WG2 Meeting #101bis, R2-1804697, Apr. 16, 2018.

"3rd Generation Partnershipship Project; Technical Specification Group Radio Access Network; Evolved Universal Terrestrial Radio Access (E-UTRA); Packet Data Convergence Protocol (PDCP) specification (Release 14)" 3GPP TS 36.323 V14.5.0, Dec. 2017.

Written Opinion and International Search Report in Application No. PCT/CN2019/077799 dated Oct. 15, 2020.

European Search Report dated Mar. 30, 2021, as received in application No. 19776827.

"Packet Duplication for the Sidelink Carrier Aggregation" 3GPP TSG-RAN WG2 Meeting #100, R2-1713841, Reno, USA, Nov. 27-Dec. 1, 2017. Samsung.

"V2X sidelink transmission procedure considering packet duplication" 3GPP TSG-RAN2#101, R2-1802696, Athens, Greece, Feb. 26-Mar. 2, 2018. LG Electronics Inc.

"Reordering timer for PDCP operation with duplication" 3GPP TSG-RAN WG2#101, R2-1803669, Athens, Greece, Feb. 26-Mar. 2, 2018. Sequans Communications.

* cited by examiner

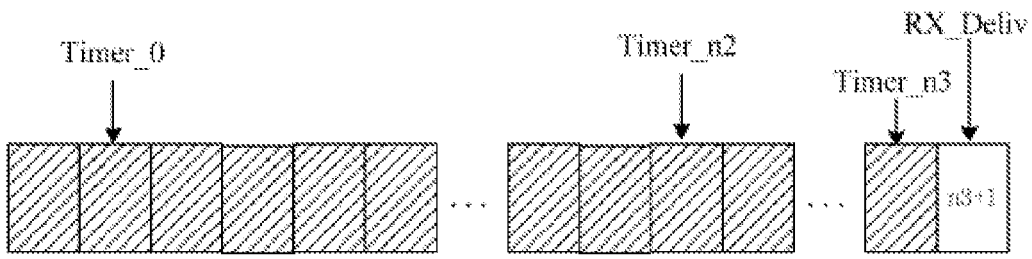
FIG. 4
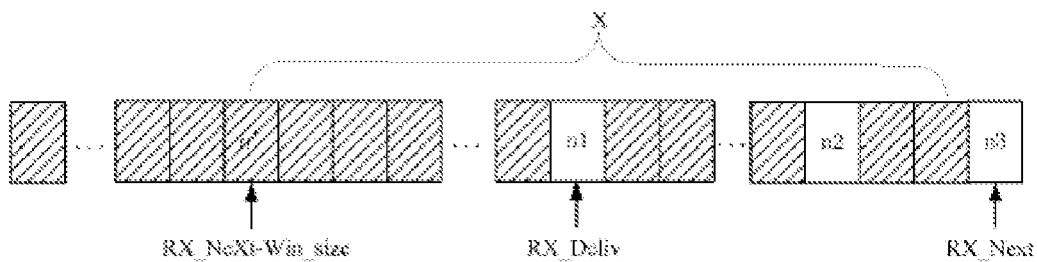
FIG. 5
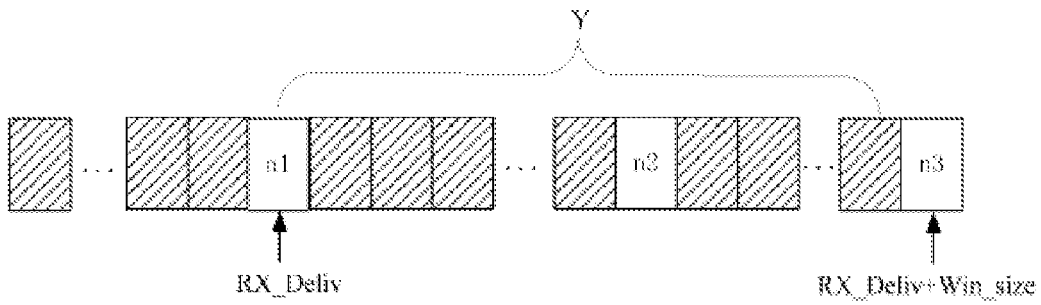
FIG. 6
Send, to a receive end, information used by the receive end to obtain a duplication detection parameter /701
FIG. 7
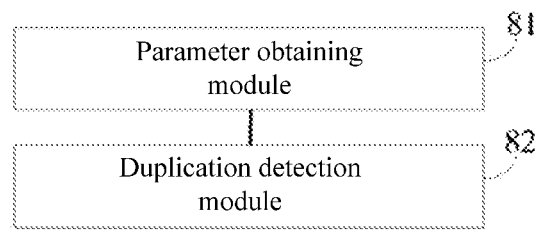
FIG. 8

Sending module — 91
FIG. 9
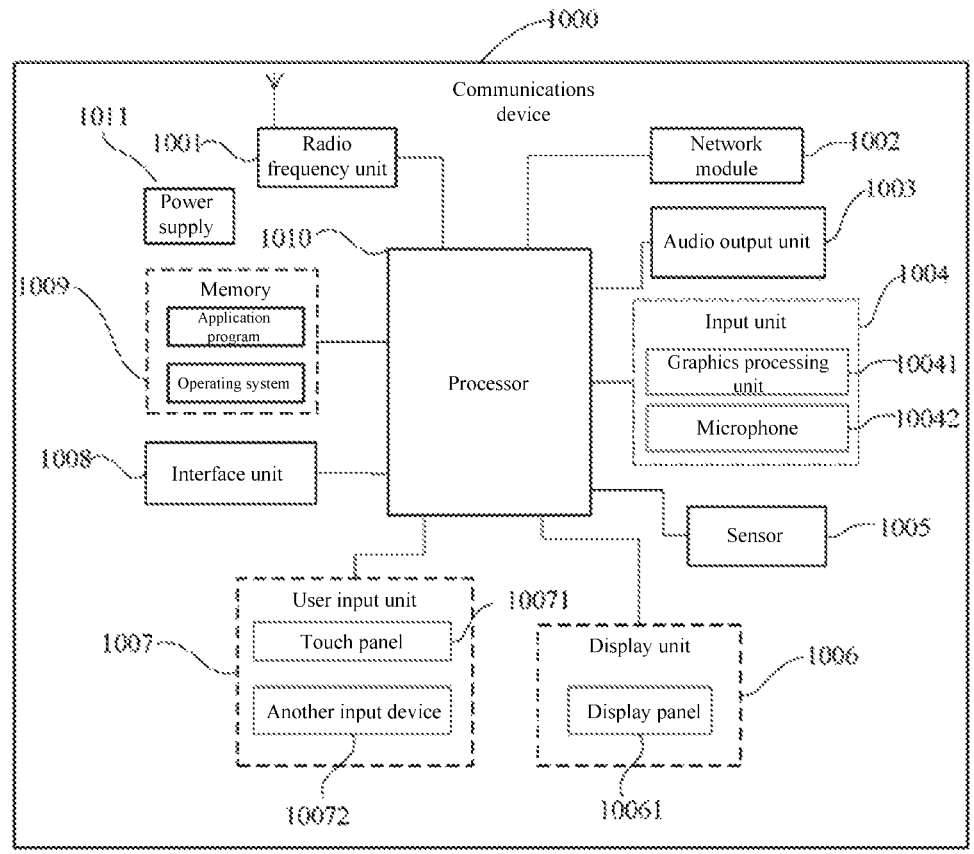
FIG. 10
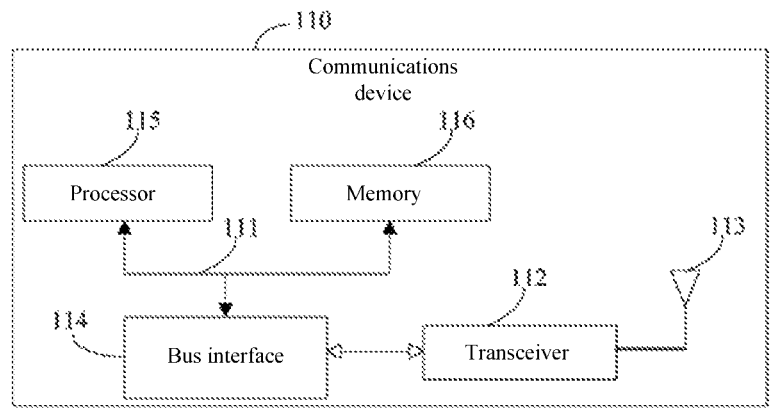
FIG. 11

RECEIVING METHOD, SENDING METHOD, AND COMMUNICATIONS DEVICE

CROSS REFERENCE OF RELATED APPLICATION

This application is a continuation application of International Application No. PCT/CN2019/077799 filed on Mar. 12, 2019, which claims priority to Chinese patent application No. 201810276861.0 filed in China on Mar. 30, 2018, which is incorporated herein by reference in its entirety.

TECHNICAL FIELD

Embodiments of the present disclosure relate to the field of sidelink data duplication technologies, and in particular, to a receiving method, a sending method, and a communications device that can perform sidelink data duplication detection.

BACKGROUND

Currently, sidelink data duplication (Sidelink Packet Duplication) is introduced to R15 V2X (Vehicle to Everything) communication, to improve reliability of sidelink V2X message transmission. A sidelink terminal performs a data duplication function at a PDCP (Packet Data Convergence Protocol, Packet Data Convergence Protocol) layer, and a duplicated sidelink PDCP PDU (Protocol Data Unit, protocol data unit) is separately transferred to two different RLC (Radio Link Control, Radio Link Control) entities. Different RLC entities correspond to different logical channels, and different logical channels have different LCIDs (logical Channel Identify, logical channel identity). In addition, because transmission of two duplicated data packets on a same carrier (Carrier) is not supported currently, when a MAC (Medium Access Control, Medium Access Control) layer processes duplicated data from different logical channels, the duplicated data needs to be transmitted by different HARQ (Hybrid Automatic Repeat reQuest, hybrid automatic repeat request) entities.

After sidelink data duplication is introduced, the current PDCP layer needs to perform duplication detection to discard a repeated data packet, but how to perform duplication detection is not clearly recorded.

SUMMARY

Embodiments of the present disclosure are intended to provide a receiving method, a sending method, and a communications device that can perform sidelink data duplication detection.

According to a first aspect, an embodiment of the present disclosure provides a receiving method operable by a receive end, including:
  obtaining a duplication detection parameter; and
  performing duplication detection on a received sidelink PDCP PDU by using the duplication detection parameter.

According to a second aspect, an embodiment of the present disclosure provides a sending method operable by a transmit end, including:
  sending, to a receive end, information used by the receive end to obtain a duplication detection parameter, where the duplication detection parameter is used by the receive end to perform duplication detection on a received sidelink packet data convergence protocol PDCP protocol data unit PDU.

According to a third aspect, an embodiment of the present disclosure further provides a communications device, including:
  a parameter obtaining module, configured to obtain a duplication detection parameter; and
  a duplication detection module, configured to perform duplication detection on a received sidelink packet data convergence protocol PDCP protocol data unit PDU by using the duplication detection parameter.

According to a fourth aspect, an embodiment of the present disclosure further provides a communications device, including:
  a sending module, configured to send, to a receive end, information used by the receive end to obtain a duplication detection parameter, where
  the duplication detection parameter is used by the receive end to perform duplication detection on a received sidelink packet data convergence protocol PDCP protocol data unit PDU.

According to a fifth aspect, an embodiment of the present disclosure further provides a communications device, including: a memory, a processor, and a program that is stored on the memory and can run on the processor, where when the program is executed by the processor, steps of the receiving method operable by a receive end are implemented, or steps of the sending method operable by a transmit end are implemented.

According to a sixth aspect, an embodiment of the present disclosure further provides a network device, including: a memory, a processor, and a program that is stored on the memory and can run on the processor, where when the program is executed by the processor, steps of the receiving method operable by a receive end are implemented, or steps of the sending method operable by a transmit end are implemented.

In the embodiments of the present disclosure, when receiving a PDCP PDU generated based on sidelink data duplication, the receive end performs duplication detection by using the determined duplication detection parameter, thereby implementing duplication detection based on the sidelink PDCP PDU.

BRIEF DESCRIPTION OF THE DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

FIG. 4 is a schematic diagram of delivering PDCP PDUs in sequence according to a specific embodiment 3 of the present disclosure;

FIG. 5 is a schematic diagram of pulling a receive window X according to a specific embodiment 4 of the present disclosure;

FIG. 6 is a schematic diagram of pushing a receive window Y according to a specific embodiment 5 of the present disclosure;

FIG. 7 is a flowchart of a sending method according to an embodiment of the present disclosure;

FIG. 8 is a schematic structural diagram 1 of a communications device according to an embodiment of the present disclosure;

FIG. 9 is a schematic structural diagram 2 of a communications device according to an embodiment of the present disclosure;

FIG. 10 is a schematic structural diagram 3 of a communications device according to an embodiment of the present disclosure; and FIG. 11 is a schematic structural diagram 4 of a communications device according to an embodiment of the present disclosure.

DETAILED DESCRIPTION

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

Figure 1:
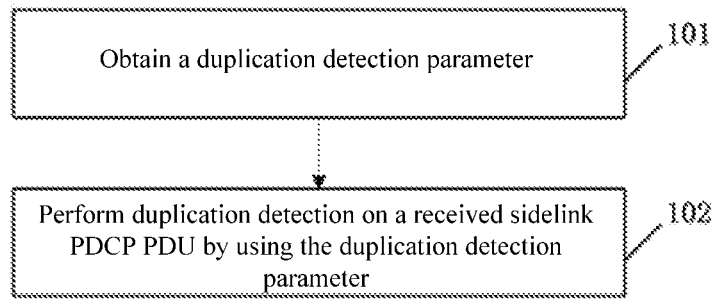
FIG. 1 is a flowchart of a receiving method according to an embodiment of the present disclosure.

An embodiment of the present disclosure provides a receiving method operable by a receive end. The receiving method is shown in FIG. 1, and includes the following steps:

Step 101: Obtain a duplication detection parameter.

Step 102: Perform duplication detection on a received sidelink PDCP PDU by using the duplication detection parameter.

The receiving method may be implemented in a protocol layer PDCP entity on the receive end. The received sidelink PDCP PDU is sent by an RLC entity.

In the receiving method in this embodiment of the present disclosure, when receiving a PDCP PDU generated based on sidelink data duplication, the receive end performs duplication detection by using the determined duplication detection parameter, thereby implementing duplication detection based on the sidelink PDCP PDU.

In a specific embodiment of the present disclosure, the duplication detection parameter may include at least one of the following parameters: a timer duration parameter, a receive window length parameter, and a sequence number (Sequence Number, SN) length parameter.

How to perform duplication detection with reference to the foregoing duplication detection parameter is described below in detail.

Manner 1

In Manner 1, the duplication detection parameter includes an SN length parameter. Correspondingly, step 102 is as follows:

When SN recording information maintained by the receive end includes a first SN of the received sidelink PDCP PDU, discard the received sidelink PDCP PDU; or otherwise, deliver a PDCP SDU (Service Data Unit, service data unit) corresponding to the received sidelink PDCP PDU to an upper-layer entity, and add the first SN to the SN recoding information.

Detailed descriptions are as follows.

In a specific embodiment 1 of the present disclosure, the receive end such as a PDCP entity of a terminal device UE may record, by using the SN recording information, an SN of a received PDCP PDU. When the SN of the received PDCP PDU exists in the SN recording information, it indicates the received PDCP PDU has been received before, and in this case, the received PDCP PDU is discarded. If the SN recording information has not recorded the SN of the received PDCP PDU, it indicates that the received PDCP PDU has not been received before, and in this case, the PDCP SDU corresponding to the received PDCP PDU may be delivered (Deliver) to the upper-layer entity.

In this way, a receiving status of the PDCP PDU is recorded by using the SN recording information, and duplication detection of the PDCP PDU is performed based on the receiving status. This implementation is simple.

Manner 2

In Manner 2, the duplication detection parameter includes an SN length parameter. Correspondingly, step 102 is as follows:

When a first SN is greater than a second SN and less than a third SN, and a PDCP SDU corresponding to the received sidelink PDCP PDU has been buffered, or when a first SN is less than a second SN, discard the received sidelink PDCP PDU; or otherwise, buffer the PDCP DSU corresponding to the sidelink PDCP PDU.

The first SN is an SN of the received sidelink PDCP PDU, the second SN is a minimum value of an SN of a PDCP PDU that has not been received before the PDCP PDU is received, and the third SN is a sum of 1 and a maximum value of an SN of a PDCP PDU that has been received before the PDCP PDU is received.

Further, after the PDCP SDU is buffered, the method may further include:

when the first SN is equal to the second SN, updating the second SN, and delivering first PDCP SDUs in the buffered PDCP SDU in sequence, where an SN of a PDCP PDU corresponding to the first PDCP SDU is less than the updated second SN, and the updated second SN is a minimum value of an SN of a PDCP PDU that has not been received currently; and when the first SN is greater than or equal to the third SN, updating the third SN to a sum of the first SN and 1.

Further, the method may further include:

when an out of sequence management timer expires, updating the second SN, and delivering second PDCP SDUs in the buffered PDCP SDU in sequence, where an SN of a PDCP PDU corresponding to the second PDCP SDU is less than the updated second SN, the updated second SN is a second minimum value of an SN of a PDCP PDU that has not been received currently, and the out of sequence management timer is started when out of sequence of packets is detected.

Further, after the second SN is updated, the method may further include:

when the second SN updated after the out of sequence management timer expires is less than the third SN, re-starting the out of sequence management timer, and updating a fourth SN to the third SN, where the fourth SN is a sum of 1 and an SN of a PDCP PDU that causes out of sequence of packets;

or when the second SN updated when the first SN is equal to the second SN is greater than or equal to a fourth SN, stopping the out of sequence management timer, where the fourth SN is a sum of 1 and an SN of a PDCP PDU that causes out of sequence of packets; and when the updated second SN is less than a third SN value, re-starting the out of sequence management timer that is stopped when the updated second SN is greater than or equal to the fourth SN, and updating the fourth SN to the third SN.

A detailed process of a specific embodiment 2 of the present disclosure is described below with reference to FIG. 2 to FIG. 3c.

Figure 2:
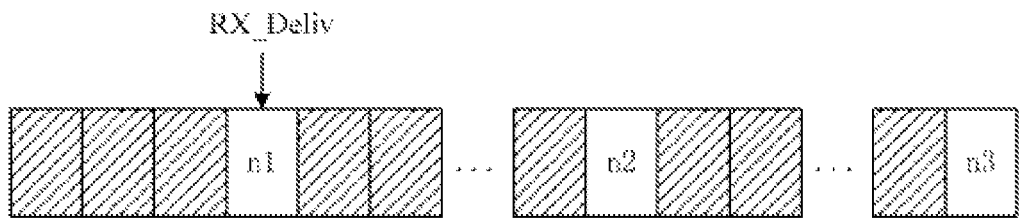
FIG. 2 is a schematic diagram of a PDCP PDU according to a specific embodiment of the present disclosure.

For example, to ensure delivery in sequence, as shown in FIG. 2, when a PDCP PDU whose SN is equal to n1 (that is, the first SN) is received, a corresponding PDCP SDU is buffered, and RX_Deliv (that is, the second SN) is updated, so that RX_Deliv points to an SN corresponding to a next PDCP PDU that has not been received. In other words, RX_Deliv is updated to n2. After RX_Deliv is updated, all PDCP SDUs whose SNs of corresponding PDCP PDUs in a buffer are less than the updated RX_Deliv (n2) are delivered in sequence. For example, PDCP SDUs corresponding to PDCP PDUs whose SNs are n1+1, n1+2, . . . , and n2−1 are delivered.

When a PDCP PDU whose SN is equal to n2 (that is, the first SN) is received, a corresponding PDCP SDU is buffered, and new RX_Deliv (that is, the second SN) is updated, so that RX_Deliv points to an SN corresponding to a next PDCP PDU that has not been received. In other words, RX_Deliv is updated to n3. After RX_Deliv is updated, all PDCP SDUs whose SNs of corresponding PDCP PDUs in the buffer are less than the updated RX_Deliv (n3) are delivered in sequence. For example, PDCP SDUs corresponding to PDCP PDUs whose SNs are n2+1, n2+2, . . . , and n3−1 are delivered.

It should be noted that, a blank block in FIG. 2 represents an SN of a PDCP PDU that has not been received, and a slash block represents an SN of a received PDCP PDU.

In the foregoing manner, delivery of the PDCP SDU is triggered after RX_Deliv is updated. However, in some scenarios, when the PDCP PDU is lost but the transmit end does not re-transmit the PDCP PDU, RX_Deliv cannot be updated, and delivery of the PDCP SDU cannot be triggered.

To avoid the foregoing situation, a plurality of means may be used in the specific embodiment 2 of the present disclosure to resolve the foregoing situation, for example, solutions such as triggering update of RX_Deliv by a timer, triggering update of RX_Deliv when the buffered PDCP SDU exceeds a preset quantity, and triggering update of RX_Deliv when a difference between a maximum SN value and a minimum SN value of the received PDCP PDU exceeds a preset value.

Triggering of update of RX_Deliv by the timer is used as an example below for description.

For example, as shown in FIG. 2, it is assumed that out of sequence of packets is detected when a PDCP PDU whose SN=n3−1 is received, and the out of sequence management timer is started. After the out of sequence management timer expires, if it is found that a PDCP PDU whose SN=n1 has not been received, RX_Deliv may be actively updated to a second minimum value of an SN of the PDCP PDU that has not been received currently, that is, updated to n2. If a PDCP PDU whose SN is equal to n2 has been received, RX_Deliv may be updated to n3.

After RX_Deliv is updated, all PDCP SDUs whose SNs of corresponding PDCP PDUs in the buffer are less than the updated RX_Deliv are delivered in sequence.

In this way, update of RX_Deliv is triggered by the timer, and delivery of the PDCP SDU is triggered by update of RX_Deliv, thereby avoiding a problem that the PDCP SDU cannot be delivered because RX_Deliv cannot be updated, and ensuring normal running of a service.

After the foregoing out of sequence management timer is set, a management problem of the out of sequence management timer is related. Detailed descriptions are as follows.

First, the out of sequence management timer is started when detecting out of sequence of packets for the first time, and after expiring or stopping actively, the out of sequence management timer is not restarted because a new out of sequence PDCP PDU is found. As shown in FIG. 2, it is assumed that out of sequence of packets is detected when a PDCP PDU whose SN is equal to n2−1 is received, and the out of sequence management timer is started, and the out of sequence management timer is not restarted when a PDCP PDU whose SN is greater than n2 is received subsequently.

Management and control of the out of sequence management timer are further described in detail below.

Figure 3A:
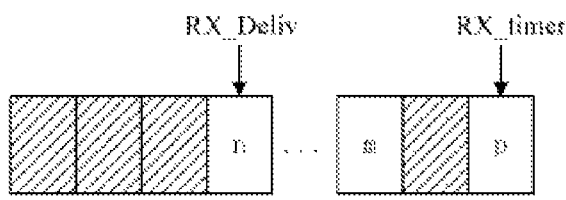
FIG. 3a to FIG. 3c are schematic diagrams of management of an out of sequence management timer according to a specific embodiment 2 of the present disclosure.
Figure 3B:
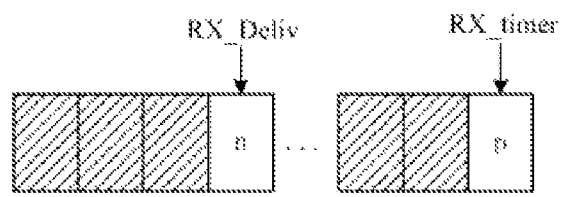
Figure 3C:
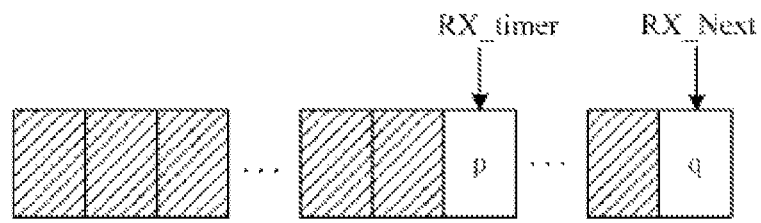

For example, as shown in FIG. 3a to FIG. 3c, it is assumed that out of sequence of packets is detected when a PDCP PDU whose SN=p−1 is received, and a RX_timer (that is, the fourth SN) is set to p−1+1, that is, p, and the out of sequence management timer is started (before expiring or stopping actively, the timer is not restarted because a new out of sequence PDCP PDU is found). In a PDCP PDU whose SN is less than p, a minimum value of a PDCP PDU that has not been received is n, and RX_Deliv (that is, the second SN) is n.

When a PDCP PDU whose SN is equal to n (n is less than m) is received currently, a PDCP SDU corresponding to the PDCP PDU is buffered first. After the PDCP SDU is buffered, update of RX_Deliv is analyzed below based on various situations.

Situation 1

After the PDCP PDU whose SN is equal to n (n is less than m) is received, as shown in FIG. 3a, a PDCP PDU that has not been received exists before the PDCP PDU whose SN is equal to p−1. It is assumed that a minimum value of an SN of the PDCP PDU that has not been received is m, and RX_Deliv is updated to m. If the updated RX_Deliv is less than the current RX_timer, it indicates that there is out of sequence of PDCP PDUs before the PDCP PDU whose SN is equal to p−1. Therefore, a status of the out of sequence management timer is kept unchanged.

Situation 2

After the PDCP PDU whose SN is equal to n is received, as shown in FIG. 3b, when a PDCP PDU that has not been received does not exist before the PDCP PDU whose SN is equal to p−1, the updated RX_Deliv is greater than or equal to the RX_timer (in FIG. 3b, the updated RX_Deliv is p, and certainly, if the PDCP PDU whose SN=p has been received before, the updated RX_Deliv is greater than p). In this case, it indicates that because an out of sequence problem caused by the received PDCP PDU whose SN is equal to p−1 has been resolved, the out of sequence timer started when the PDCP PDU whose SN is equal to p−1 is received may be shut down until a new out of sequence problem is found.

Situation 3

In the situation 2, the out of sequence problem caused by the received PDCP PDU whose SN is equal to p−1 has been resolved. However, because receiving of PDCP PDUs is a continuous process, as shown in FIG. 3c, it is assumed that before the out of sequence problem caused by receiving of the PDCP PDU whose SN is equal to p−1 is resolved, a PDCP PDU whose SN is equal to q−1 is further received, and in this case, RX_Next (that is, the third SN) is updated to q, where q−1 is greater than p.

When RX_Deliv is greater than or equal to p after being updated at a specific moment, it indicates that the out of sequence problem caused by receiving of the PDCP PDU whose SN is equal to p−1 is resolved, and in this case, the out of sequence management timer started when the PDCP PDU whose SN is equal to p−1 is received is shut down.

Then, because the PDCP PDU whose SN is equal to q−1 has been received, if the updated RX_Deliv is less than q (RX_Next), it indicates that at least one PDCP PDU whose SN is less than q has not been received. In this case, although the out of sequence problem caused by receiving of the PDCP PDU whose SN is equal to p−1 is resolved, an out of sequence situation still exists, RX_timer is updated to RX_Next, and a new round of out of sequence management starts.

In addition, after RX_Deliv is updated after the out of sequence management timer expires, if a PDCP SDU whose SN is greater than the updated RX_Deliv exists in the received PDCP PDU, it indicates that the out of sequence problem still exists, and in this case, the out of sequence management timer needs to be restarted, and RX_timer is updated to RX_Next. In other words, the RX_timer is updated to a sum of 1 and a maximum value of an SN of a currently received PDCP PDU.

Manner 3

In Manner 3, the duplication detection parameter includes an SN length parameter and a timer duration parameter of a duplication detection timer corresponding to an SN. Correspondingly, step 102 is as follows:

When a duplication detection timer corresponding to the first SN is in a valid state, discard the received sidelink PDCP PDU; or otherwise, buffer the PDU SDU corresponding to the received sidelink PDCP PDU, and start the duplication detection timer corresponding to the first SN.

Further, after the PDCP SDU is buffered, the method further includes:

when the first SN is equal to the second SN, updating the second SN, where the updated second SN is a minimum value of an SN of a PDCP PDU that has not been received currently; and after a duplication detection timer corresponding to the first SN expires, when the first SN is less than the second SN, delivering third PDCP SDUs in the buffered PDCP SDU in sequence, or otherwise, deleting the PDCP SDU corresponding to the received PDCP PDU, where the second SN is a minimum value of the SN of the PDCP PDU that has not been received, and an SN of a PDCP PDU corresponding to the third PDCP SDU is less than or equal to the first SN.

Further, the method further includes:

updating the second SN after the out of sequence management timer expires, where an un-updated second SN is a minimum value of an SN of a PDCP PDU that has not been received before a PDCP PDU delivered by the RLC entity is received, the updated second SN is a second minimum value of an SN of a PDCP PDU that has not been received currently, and the out of sequence management timer is started when out of sequence of packets is detected.

Further, after the second SN is updated, the method may further include:

when the second SN updated when the first SN is equal to the second SN is greater than or equal to a fourth SN, stopping the out of sequence management timer, where the fourth SN is a sum of 1 and an SN of a PDCP PDU that causes out of sequence of packets; and when an SN corresponding to a duplication detection timer in a valid state includes an SN greater than the updated second SN, restarting the stopped out of sequence management timer, and updating the fourth SN to a sum of 1 and a maximum value of the SN corresponding to the duplication detection timer in the valid state;

or when an SN corresponding to a duplication detection timer in a valid state includes an SN greater than the second SN updated after the out of sequence management timer expires, or when the second SN updated after the out of sequence management timer expires is less than the fourth SN, re-starting the expired out of sequence management timer, and updating the fourth SN to a sum of 1 and a maximum value of the SN corresponding to the duplication detection timer in the valid state, where the un-updated fourth SN is a sum of 1 and an SN of a PDCP PDU that causes out of sequence of packets.

A detailed process of a specific embodiment 3 of the present disclosure is described below with reference to FIG. 2 and FIG. 4.

Specifically, to ensure delivery in sequence, in the specific embodiment 3 of the present disclosure, one duplication detection timer is set for each received and buffered PDCP SDU, and the duplication detection timer has two functions: One is for duplication detection, information of which has been described before and details of which are not repeatedly described herein again; and the other is for triggering delivery of the PDCP SDU with reference to other conditions.

Same as the foregoing specific embodiment, in the specific embodiment 3 of the present disclosure, one RX_Deliv (indicating a minimum of the SN of the PDCP PDU that has not been received currently, that is, the second SN) and one RX_Timer (a sum of 1 and an SN of a received PDCP PDU that causes out of sequence, that is, the fourth SN) are also set.

As shown in FIG. 2, when a PDCP PDU whose SN is equal to n1 is received, a corresponding PDCP SDU is buffered, and RX_Deliv is updated, so that RX_Deliv points to an SN corresponding to a next PDCP PDU that has not been received. In other words, RX_Deliv is updated to n2. In addition, a corresponding duplication detection timer is started after the PDCP PDU whose SN=n1 is received, and after the duplication detection timer expires, if a corresponding SN is less than a current RX_Deliv, PDCP SDUs corresponding to all PDCP PDUs whose corresponding SNs are less than or equal to n1 are delivered in sequence.

Further, as shown in FIG. 2, it is assumed that when a PDCP PDU whose SN is equal to n2 is received first, a corresponding PDCP SDU is also buffered, but RX_Deliv is not updated, and in this case, a value of RX_Deliv is still n1. In addition, a corresponding duplication detection timer is started after the PDCP PDU whose SN is equal to n2 is received. After the duplication detection timer expires, if a corresponding SN is greater than or equal to the current RX_Deliv, a PDCP PDU whose SN is less than n2 has not been received yet. In this case, to ensure delivery in sequence, a PDCP SDU corresponding to the PDCP PDU whose SN is equal to n2 is deleted.

How to deliver PDCP SDUs in sequence is shown in FIG. 4. As shown in FIG. 4, assuming that the current RX_Deliv is equal to n3+1, if a Timer_n2 expires first, PDCP SDUs corresponding to all PDCP PDUs whose SNs are less than or equal to n2 are delivered in sequence, and the corresponding duplication detection timer is deleted. Then, a Timer_n3 expires, PDCP SDUs corresponding to all PDCP PDUs whose SNs are less than or equal to n3 and greater than n2 are delivered in sequence, and the corresponding duplication detection timer is deleted. If the Timer_n3 expires first, PDCP SDUs corresponding to all PDCP PDUs whose SNs are less than or equal to n3 are delivered in sequence, and the corresponding duplication detection timer is deleted.

In the specific embodiment 3 of the present disclosure, delivery of the PDCP SDU needs to meet a condition, that is, an SN of a corresponding PDCP PDU needs to be less than the current RX_Deliv. However, in some scenarios, when the PDCP PDU is lost but the transmit end does not re-transmit the PDCP PDU, RX_Deliv cannot be updated, and delivery of the PDCP SDU cannot be triggered. As shown in FIG. 2, if a PDCP PDU whose SN is equal to n1 cannot be received, a PDCP SDU corresponding to the received PDCP PDU whose SN is greater than n1 cannot be delivered.

To avoid the foregoing situation, a plurality of means may be used in the specific embodiment 3 of the present disclosure to resolve the foregoing situation, for example, solutions such as triggering update of RX_Deliv by a timer, triggering update of RX_Deliv when the buffered PDCP SDU exceeds a preset quantity, and triggering update of RX_Deliv when a difference between a maximum SN value and a minimum SN value of the received PDCP PDU exceeds a preset value.

Triggering of update of RX_Deliv by the timer is used as an example below for description.

For example, as shown in FIG. 2, it is assumed that out of sequence of packets is detected when a PDCP PDU whose SN=n3−1 is received, and the out of sequence management timer is started. After the out of sequence management timer expires, if it is found that a PDCP PDU whose SN=n1 is not received, RX_Deliv may be forcibly updated to a second minimum value of an SN of the PDCP PDU that has not been received currently, that is, updated to n2. After RX_Deliv is updated, SNs of PDCP SDUs corresponding to PDCP PDUs in the un-updated RX_Deliv and the updated RX_Deliv may meet a delivery condition, and delivery is triggered.

In this way, by using a solution of triggering update of RX_Deliv by the timer, a problem that the PDCP SDU cannot be delivered because RX_Deliv cannot be updated can be avoided, and normal running of a service is ensured.

After the foregoing out of sequence management timer is set, a management problem of the out of sequence management timer is related. Detailed descriptions are as follows.

A management criterion is basically the same as that in the specific embodiment 2, that is:

when the updated RX_Deliv is less than the current RX_timer, a status of the out of sequence management timer is kept unchanged; and when the updated RX_Deliv is greater than or equal to the current RX_timer, it indicates that the out of sequence problem caused by receiving of a PDCP PDU is resolved, and in this case, the out of sequence management timer may be shut down.

After RX_Deliv is updated after the out of sequence management timer expires, if a PDCP SDU whose SN is greater than the updated RX_Deliv exists in the received PDCP PDU (determining based on whether to start the duplication timer), it indicates that the out of sequence problem still exists, and in this case, the out of sequence management timer needs to be restarted, and RX_timer is updated to RX_Next. In other words, the RX_timer is updated to a sum of 1 and a maximum value of an SN of the currently received PDCP PDU.

Manner 4

In Manner 4, the duplication detection parameter includes an SN length parameter and a receive window length parameter of a first receive window. Correspondingly, step 102 is as follows:

When the first SN is greater than a second SN and is less than a third SN, and the PDCP SDU corresponding to the received sidelink PDCP PDU has been buffered, or when the first SN is less than the second SN and is greater than or equal to a difference between the third SN and a first receive window size, discard the received sidelink PDCP PDU; or otherwise, buffer the PDCP SDU corresponding to the received sidelink PDCP PDU.

The second SN is a minimum value of an SN of a PDCP PDU that has not been received before the PDCP PDU is received, and the third SN is a sum of 1 and a maximum value of an SN of a PDCP PDU that has been received before the PDCP PDU is received.

Further, after the PDCP SDU corresponding to the received PDCP PDU is buffered, the method may further include:

when the first SN is equal to the second SN, updating the second SN, and delivering fourth PDCP SDUs in the buffered PDCP SDU in sequence, where an SN of a PDCP PDU corresponding to the fourth PDCP SDU is less than the updated second SN, and the updated second SN is a minimum value of an SN of a PDCP PDU that has not been received currently; and when the first SN is less than a difference between the third SN and a first receive window size, updating the third SN to a sum of the first SN and 1, updating the second SN, and delivering buffered PDCP SDUs outside an updated first receive window in sequence, where the updated second SN is a minimum value in an SN of a PDCP PDU that has not been received and that falls within the updated first receive window;

when the first SN is greater than or equal to the third SN, updating the third SN to the sum of the first SN and 1, and delivering fifth PDCP SDUs in the buffered PDCP SDU in sequence, where an SN of a PDCP PDU corresponding to the fifth PDCP SDU is less than a difference between the updated third SN and the first receive window size; and when the second SN is less than the difference between the updated third SN and the first receive window size, updating the second SN, and delivering sixth PDCP SDUs in the buffered PDCP SDU in sequence, where an SN of a PDCP PDU corresponding to the sixth PDCP SDU is less than the updated second SN, and the updated second SN is a minimum value in an SN of a PDCP PDU that has not been received and that falls within the updated first receive window, where the updated first receive window is determined based on the updated third SN and a difference between the updated third SN and the first receive window size.

A detailed process of a specific embodiment 4 of the present disclosure is described below with reference to FIG. 5.

For example, as shown in FIG. 5, in the specific embodiment 4 of the present disclosure, one RX_Deliv (indicating a minimum value of an SN of a PDCP PDU that has not been received, that is, the second SN) and one receive window X are set, where a size of the receive window X is Win_Size, RX_Next indicates a sum (that is, the third SN) of 1 and a maximum value of the SN of the PDCP PDU that has been received, the receive window X is determined based on RX_Next and a difference between RX_Next and Win_Size (that is, RX_Next−Win_Size), and RX_Deliv is within the receive window X.

In this embodiment of the present disclosure, when an SN of a PDCP PDU is greater than or equal to RX_Next−Win_Size and is less than RX_Next, it is considered that the PDCP PDU falls within the receive window, or otherwise falls outside the window.

When a PDCP PDU whose SN is greater than n1 and less than n3 and whose corresponding PDCP SDU has been buffered is received, the PDCP PDU corresponding to the SN is discarded; when a PDCP PDU whose SN is less than n1 and greater than n' is received, it is directly considered that a corresponding PDCP SDU has been buffered, and the PDCP SDU is discarded; and when a PDCP PDU whose SN is equal to n1 is received, a corresponding PDCP SDU is buffered.

Further, when a PDCP PDU whose SN is equal to n1 (that is, equal to RX_Deliv) is received, RX_Deliv may be updated, so that RX_Deliv points to an SN of a next PDCP PDU that has not been received. In other words, RX_Deliv is updated to n2, and PDCP SDUs corresponding to all PDCP PDUs whose SNs are less than n2 in the buffer are delivered in sequence.

When a PDCP PDU whose SN is less than n' (that is, less than RX_Next−Win_Size) is received, RX_Next may be updated to a sum of n' and 1, and RX_Deliv is updated. A PDCP PDU corresponding to the updated RX_Deliv falls within an updated receive window, and the updated RX_Deliv is a minimum value in an SN of a PDCP PDU that has not been received and that falls within the receive window X. After the update is completed, buffered PDCP SDUs located outside the updated receive window X (that is, a left side of the receive window X shown in FIG. 5) are delivered in sequence. The updated receive window X is determined based on the updated RX_Next and a difference between the updated RX_Next and Win_Size.

When a PDCP PDU whose SN is greater than or equal to n3 (that is, greater than or equal to RX_Next) is received, RX_Next may be updated to a maximum value in an SN of a PDCP PDU that is currently received, and PDCP SDUs corresponding to all PDCP PDUs whose SNs are less than a difference between the updated RX_Next and Win_Size in the buffer are delivered in sequence.

After RX_Next is updated, RX_Deliv may be updated. When RX_Deliv is less than a difference between the updated RX_Next and Win_Size, RX_Deliv can be updated. A PDCP PDU corresponding to the updated RX_Deliv falls within an updated receive window X, and the updated RX_Deliv is a minimum value in an SN of a PDCP PDU that has not been received and that falls within the receive window X. After the update is completed, PDCP SDUs corresponding to all PDCP PDUs whose SNs are less than the updated RX_Deliv in the buffer are delivered in sequence. The updated receive window X is determined based on the updated RX_Next and a difference between the updated RX_Next and Win_Size.

Manner 5

In Manner 5, the duplication detection parameter includes an SN length parameter and a receive window length parameter of a second receive window. Correspondingly, step 102 is as follows:

When the first SN is greater than or equal to the second SN and is less than a sum of the second SN and a second receive window size, and the PDCP SDU corresponding to the received sidelink PDCP PDU has been buffered, or when the first SN is less than the second SN, or when the first SN is greater than or equal to a sum of the second SN and a second receive window size, discard the received sidelink PDCP PDU; or otherwise, buffer the PDCP SDU corresponding to the received sidelink PDCP PDU, where
the second SN is a minimum value of an SN of a PDCP PDU that has not been received before the PDCP PDU is received.

Further, after the received PDCP PDU is buffered, the method further includes:
when the first SN is equal to the second SN, updating the second SN, and delivering seventh PDCP SDUs in the buffered PDCP SDU in sequence, where
an SN of a PDCP PDU corresponding to the seventh PDCP SDU is less than the updated second SN, and the updated second SN is a minimum value of an SN of a PDCP PDU that has not been received currently.

Further, the method may further include:
when the out of sequence management timer expires, updating the second SN, and delivering eighth PDCP SDUs in the buffered PDCP SDU in sequence, where
an SN of a PDCP PDU corresponding to the eighth PDCP SDU is less than the updated second SN, the updated second SN is a second minimum value of an SN of a PDCP PDU that has not been received currently, and the out of sequence management timer is started when out of sequence of packets is detected.

A detailed process of a specific embodiment 5 of the present disclosure is described below with reference to FIG. 6.

For example, as shown in FIG. 6, in the specific embodiment 5 of the present disclosure, one RX_Deliv (indicating a minimum value of an SN of a PDCP PDU that has not been received, that is, the second SN) and one receive window Y are set, where a size of the receive window Y is Win_Size, and the receive window Y is determined based on RX_Deliv and a sum of RX_Deliv and Win_Size (that is, RX_Deliv+Win_Size).

As shown in FIG. 6, in a specific embodiment of the present disclosure, when an SN of a PDCP PDU is greater than or equal to RX_Deliv and is less than RX_Deliv+Win_Size, it is considered that the PDCP PDU falls within the receive window Y, or otherwise falls outside the window Y.

When a PDCP PDU whose SN is greater than or equal to n1 and less than n3 is received, because the PDCP PDU falls within the receive window Y, if a PDCP SDU corresponding to the PDCP PDU has been buffered, the PDCP PDU is discarded; when a PDCP PDU whose SN is less than n1 is received, the PDCP PDU falls outside the receive window, and a PDCP PDU whose SN is equal to n1−1 is discarded; when a PDCP PDU whose SN is greater than or equal to n3 is received, because the PDCP PDU falls outside the receive window, the PDCP PDU is also discarded; and when a PDCP PDU whose SN is equal to n1 is received, a corresponding PDCP SDU is buffered.

Further, when the PDCP PDU whose SN is equal to n1 (that is, equal to RX_Deliv) is received, RX_Deliv may be updated, so that RX_Deliv points to an SN of a next PDCP PDU that has not been received. In other words, RX_Deliv is updated to n2. PDCP SDUs corresponding to all PDCP PDUs whose SNs are less than n2 in the buffer are delivered in sequence.

In the foregoing manner, delivery of the PDCP SDU is triggered after RX_Deliv is updated. However, in some scenarios, when the PDCP PDU is lost but the transmit end does not re-transmit the PDCP PDU, RX_Deliv cannot be updated, and delivery of the PDCP SDU cannot be triggered.

To avoid the foregoing situation, a plurality of means may be used in the specific embodiment 5 of the present disclosure to resolve the foregoing situation, for example, solutions such as triggering update of RX_Deliv by a timer, triggering update of RX_Deliv when the buffered PDCP SDU exceeds a preset quantity, and triggering update of RX_Deliv when a difference between a maximum SN value and a minimum SN value of the received PDCP PDU exceeds a preset value.

Triggering of update of RX_Deliv by the timer is used as an example below for description.

For example, as shown in FIG. 6, it is assumed that out of sequence of packets is detected when a PDCP PDU whose SN=n3−1 is received, and the out of sequence management timer is started. After the out of sequence management timer expires, if it is found that a PDCP PDU whose SN=n1 has not been received, RX_Deliv may be forcibly updated to a second minimum value of an SN of the PDCP PDU that has not been received currently, that is, updated to n2. If a PDCP PDU whose SN is equal to n2 has been received, RX_Deliv may be updated to n3.

After RX_Deliv is updated, the out of sequence management timer is restarted, and all PDCP SDUs whose SNs of corresponding PDCP PDUs in the buffer are less than the updated RX_Deliv are delivered in sequence.

In this way, update of RX_Deliv is triggered by the timer, and delivery of the PDCP SDU is triggered by update of RX_Deliv, thereby avoiding a problem that the PDCP SDU cannot be delivered because RX_Deliv cannot be updated, and ensuring normal running of a service.

In the specific embodiment of the present disclosure, the receive end may perform the foregoing duplication detection by using the foregoing duplication detection parameter.

The duplication detection parameter may be obtained in a plurality of direct or indirect manners. Descriptions are separately provided below.

In one manner, the receive end may directly obtain the duplication detection parameter based on protocol convention.

In this manner, the foregoing duplication detection parameter has already been defined in a related protocol, such as a timer duration parameter, a receive window length parameter, and a sequence number length parameter, and the receive end may directly read a related parameter when executing a related service.

In another manner, a duplication detection parameter corresponding to a service attribute of a target service may be obtained by using a first correspondence between a service attribute parameter and the duplication detection parameter, where the target service is a service carried by the PDCP PDU.

The foregoing correspondence may be embodied by using a mapping table.

Detailed descriptions are as follows.

A sidelink may be used for services with various different requirements, for example, a service with a relatively high requirement for a delay, or a service with a relatively high requirement for reliability.

In the specific embodiment of the present disclosure, based on different service requirements, correspondences between different service attribute parameters and the duplication detection parameter are established. When receiving a PDCP PDU duplicated by the sidelink, the receive end may determine, based on a service carried by the PDCP PDU, a duplication detection parameter corresponding to the service, and perform duplication detection by using the duplication detection parameter.

The service attribute parameter includes at least one of the following parameters: a PPPP (Proximity-based Services Per-Packet Priority) parameter, a PPPR (ProSe Per-Packet Reliability) parameter, and an SLRB ID (SideLink Radio Bear ID) parameter.

For a service with a relatively low requirement for a delay (related to the PPPR parameter), relatively long duration may be set for a corresponding timer, and for a service with a relatively high requirement for the delay, relatively short duration may be set for a corresponding timer.

For a service with a relatively low requirement for a delay (related to the PPPR parameter), a relatively large corresponding receive window length parameter may be set, and for a service with a relatively high requirement for the delay, a relatively small corresponding receive window length parameter may be set.

For a service with a relatively high requirement for reliability (related to the PPPP parameter), relatively long duration may be set for a corresponding timer, and for a service with a relatively low requirement for reliability, relatively short duration may be set for a corresponding timer.

For a service with a relatively high requirement for reliability (related to the PPPP parameter), a relatively large corresponding receive window length parameter may be set, and for a service with a relatively low requirement for reliability, a relatively small corresponding receive window length parameter may be set.

How to specifically set the foregoing correspondence may be set differentially based on requirements. Further detailed descriptions are not provided herein.

In a specific embodiment of the present disclosure, the foregoing first correspondence may be simultaneously configured on the transmit end and the receive end, for example, through protocol convention, or may be pre-configured (for example, is configured during delivery, or is autonomously configured by a user). In this case, the transmit end and the receive end may autonomously obtain the foregoing first correspondence from the transmit end and the receive end.

However, in the specific embodiment of the present disclosure, configuration may be performed only on the transmit end, and when needed, the transmit end sends the first correspondence to the receive end. In other words, the method in the specific embodiment of the present disclosure further includes:

receiving the first correspondence sent by the transmit end.

In still another manner, a duplication detection parameter corresponding to a logical channel parameter of a target logical channel may be obtained by using a second correspondence between a logical channel parameter and the duplication detection parameter, where the target logical channel is a logical channel for transmitting the PDCP PDU.

As mentioned before, the duplicated sidelink PDCP PDU is separately delivered to two different RLC entities, different RLC entities correspond to different logical channels, and different logical channels have different LCIDs.

Therefore, different duplication detection policies may be set for different logical channels in the specific embodiment of the present disclosure.

The foregoing logical channel parameter may be a logical channel priority parameter.

For a service with a relatively low logical channel priority, relatively long duration may be set for a corresponding timer, and for a service with a relatively high logical channel priority, relatively short duration may be set for a corresponding timer.

For a service with a relatively high logical channel priority, a relatively large corresponding receive window length parameter may be set, and for a service with a relatively low logical channel priority, a relatively small corresponding receive window length parameter may be set.

How to specifically set the foregoing correspondence may be set differentially based on requirements. Further detailed descriptions are not provided herein.

In a specific embodiment of the present disclosure, the foregoing second correspondence may be simultaneously configured on the transmit end and the receive end, for example, through protocol convention, or may be pre-configured (for example, is configured during delivery, or is autonomously configured by a user). In this case, the transmit end and the receive end may autonomously obtain the foregoing second correspondence from the transmit end and the receive end.

However, in the specific embodiment of the present disclosure, configuration may be performed only on the transmit end, and when needed, the transmit end sends the first correspondence to the receive end. In other words, the method in the specific embodiment of the present disclosure further includes:

receiving the second correspondence sent by the transmit end.

In a final manner, the transmit end may directly send a message that carries the duplication detection parameter. After receiving the message, the receive end may directly parse the message and obtain the duplication detection parameter carried in the message, and perform the foregoing duplication detection by using the foregoing duplication detection parameter.

The transmit end may determine the duplication detection parameter based on the foregoing various correspondence.

In a specific embodiment of the present disclosure, the foregoing duplication detection parameter, the first correspondence, and the second correspondence may be transmitted by the transmit end to the receive end in advance by using a sidelink channel such as a sidelink broadcast channel.

As shown in FIG. 7, an embodiment of the present disclosure provides a sending method operable by a transmit end, including the following steps:

Step 701: Send, to a receive end, information used by the receive end to obtain a duplication detection parameter.

The duplication detection parameter is used by the receive end to perform duplication detection on a received sidelink packet data convergence protocol PDCP protocol data unit PDU.

In this embodiment of the present disclosure, when receiving a PDCP PDU generated based on sidelink data duplication, the receive end performs duplication detection by using the determined duplication detection parameter, thereby implementing duplication detection based on the sidelink PDCP PDU.

Optionally, the duplication detection parameter includes at least one of the following parameters: a timer duration parameter, a receive window length parameter, and a sequence number length parameter.

Optionally, the information carries the duplication detection parameter, or a first correspondence between a service attribute parameter and the duplication detection parameter, or a second correspondence between a logical channel parameter and the duplication detection parameter.

Optionally, the service attribute parameter includes at least one of the following parameters: a PPPP parameter, a PPPR parameter, and an SLRB identifier parameter.

The logical channel parameter is a logical channel priority parameter.

The receiving method in the present disclosure is described in the foregoing embodiment. A communications device in the present disclosure is described below with reference to embodiments and accompanying drawings.

As shown in FIG. 8, an embodiment of the present disclosure further provides a communications device, including:

a parameter obtaining module 81, configured to obtain a duplication detection parameter; and a duplication detection module 82, configured to perform duplication detection on a received sidelink packet data convergence protocol PDCP protocol data unit PDU by using the duplication detection parameter.

In this embodiment of the present disclosure, when receiving a PDCP PDU generated based on sidelink data duplication, the receive end performs duplication detection by using the determined duplication detection parameter, thereby implementing duplication detection based on the sidelink PDCP PDU.

Optionally, the duplication detection parameter includes at least one of the following parameters: a timer duration parameter, a receive window length parameter, and a sequence number length parameter.

Optionally, the parameter obtaining module 81 specifically includes:

a first obtaining unit, configured to obtain the duplication detection parameter based on protocol convention;

or a second obtaining unit, configured to obtain, by using a first correspondence between a service attribute parameter and the duplication detection parameter, a duplication detection parameter corresponding to a service attribute of a target service, where the target service is a service carried by the received sidelink PDCP PDU;

or a third obtaining unit, configured to obtain, by using a second correspondence between a logical channel parameter and the duplication detection parameter, a duplication detection parameter corresponding to a logical channel parameter of a target logical channel, where the target logical channel is a logical channel for transmitting the received sidelink PDCP PDU;

or a fourth obtaining unit, configured to obtain the duplication detection parameter carried in a message sent by a transmit end.

Optionally, the service attribute parameter includes at least one of the following parameters: a PPPP parameter, a PPPR parameter, and an SLRB identifier parameter.

The logical channel parameter is a logical channel priority parameter.

Optionally, the communications device further includes:

a receiving module, configured to receive the first correspondence and/or the second correspondence sent by the transmit end.

Optionally, the fourth obtaining unit is specifically configured to:

obtain the duplication detection parameter carried in a message sent by the transmit end by using a sidelink channel; or obtain the duplication detection parameter carried in a message sent by the transmit end by using a sidelink broadcast channel.

Optionally, the duplication detection parameter includes a sequence number length parameter, and the duplication detection module 82 is specifically configured to: when SN recording information maintained by the communications device comprises a first SN, discard the received sidelink PDCP PDU; or otherwise, deliver a PDCP SDU corresponding to the received sidelink PDCP PDU to an upper-layer entity, and add the first SN to the SN recoding information.

Optionally, the duplication detection parameter includes a sequence number length parameter, and the duplication detection module 82 is specifically configured to: when the first SN is greater than a second SN and is less than a third SN, and the PDCP SDU corresponding to the received sidelink PDCP PDU has been buffered, or when the first SN is less than the second SN, discard the received sidelink PDCP PDU; or otherwise, buffer the PDCP SDU corresponding to the received sidelink PDCP PDU, where the second SN is a minimum value of an SN of a PDCP PDU that has not been received before the PDCP PDU is received, and the third SN is a sum of 1 and a maximum value of an SN of a PDCP PDU that has been received before the PDCP PDU is received.

Optionally, the duplication detection parameter includes a sequence number length parameter and a timer duration parameter of a duplication detection timer corresponding to an SN, and the duplication detection module 82 is specifically configured to: when a duplication detection timer corresponding to the first SN is in a valid state, discard the received sidelink PDCP PDU; or otherwise, buffer the PDU SDU corresponding to the received sidelink PDCP PDU, and start the duplication detection timer corresponding to the first SN.

Optionally, the duplication detection parameter includes a sequence number length parameter and a receive window length parameter of a first receive window, and the duplication detection module 82 is specifically configured to: when the first SN is greater than a second SN and is less than a third SN, and the PDCP SDU corresponding to the received sidelink PDCP PDU has been buffered, or when the first SN is less than the second SN, discard the received sidelink PDCP PDU; or otherwise, buffer the PDCP SDU corresponding to the received sidelink PDCP PDU, where the second SN is a minimum value of an SN of a PDCP PDU that has not been received before the PDCP PDU is received, and the third SN is a sum of 1 and a maximum value of an SN of a PDCP PDU that has been received before the PDCP PDU is received.

Optionally, the duplication detection parameter includes a sequence number length parameter and a receive window length parameter of a second receive window, and the duplication detection module 82 is specifically configured to: when the first SN is greater than or equal to a second SN and is less than a sum of the second SN and a second receive window size, and the PDCP SDU corresponding to the received sidelink PDCP PDU has been buffered, or when the first SN is less than the second SN, or when the first SN is greater than or equal to a sum of the second SN and a second receive window size, discard the received sidelink PDCP PDU; or otherwise, buffer the PDCP SDU corresponding to the received sidelink PDCP PDU, where the second SN is a minimum value of an SN of a PDCP PDU that has not been received before the PDCP PDU is received.

As shown in FIG. 9, an embodiment of the present disclosure further provides a communications device, including:

a sending module 91, configured to send, to a receive end, information used by the receive end to obtain a duplication detection parameter, where the duplication detection parameter is used by the receive end to perform duplication detection on a received sidelink packet data convergence protocol PDCP protocol data unit PDU.

Optionally, the duplication detection parameter includes at least one of the following parameters: a timer duration parameter, a receive window length parameter, and a sequence number length parameter.

Optionally, the information carries the duplication detection parameter, or a first correspondence between a service attribute parameter and the duplication detection parameter, or a second correspondence between a logical channel parameter and the duplication detection parameter.

Optionally, the service attribute parameter includes at least one of the following parameters: a PPPP parameter, a PPPR parameter, and an SLRB identifier parameter.

The logical channel parameter is a logical channel priority parameter.

An embodiment of the present disclosure further provides a communications device, including a processor, a memory, and a computer program that is stored on the memory and can run on the processor. When the computer program is executed by the processor, processes in the embodiments of the foregoing receiving method are implemented, or processes in the embodiments of the foregoing sending method are implemented, and the same technical effects can be achieved. To avoid repetition, details are not described herein again.

Specifically, FIG. 10 is a schematic diagram of a hardware structure of a communications device for implementing various embodiments of the present disclosure. A communications device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the structure shown in FIG. 10 does not constitute a limitation on a terminal, and the communications device may include more or fewer components than those shown in the figure, or may combine some components, or may have different component arrangements. In this embodiment of the present disclosure, the communications device includes but is not limited to a mobile phone, a tablet computer, a notebook computer, a palmtop computer, an in-vehicle terminal, a wearable device, a pedometer, and the like.

When the communications device 1000 is a receive end, the processor 1010 is configured to:

obtain a duplication detection parameter, and perform duplication detection on a received sidelink PDCP PDU by using the duplication detection parameter.

When the communications device 1000 is a transmit end, the processor 1010 is configured to: control the radio frequency unit 1001 to send, to a receive end, information used by the receive end to obtain a duplication detection parameter, where the duplication detection parameter is used by the receive end to perform duplication detection on a received sidelink PDCP PDU.

In this embodiment of the present disclosure, when receiving a PDCP PDU generated based on sidelink data duplication, the receive end performs duplication detection by using the determined duplication detection parameter, thereby implementing duplication detection based on the sidelink PDCP PDU.

It should be understood that, in this embodiment of the present disclosure, the radio frequency unit 1001 may be configured to receive and send a signal in an information transmitting and receiving process or in a call process, and specifically, after receiving downlink data from a base station, send the downlink data to the processor 1010 for processing, and in addition, send uplink data to the base station. Generally, the radio frequency unit 1001 includes but is not limited to an antenna, at least one amplifier, a transceiver, a coupler, a low noise amplifier, and a duplexer. In addition, the radio frequency unit 1001 may further communicate with a network and another device through by using a wireless communication system.

The communications device provides wireless broadband Internet access for a user by using the network module 1002, for example, helps the user transmit and receive an e-mail, browse a website, and access stream media.

The audio output unit 1003 may convert, into an audio signal, audio data received by the radio frequency unit 1001 or the network module 1002 or stored in the memory 1009, and output the audio signal as sound. In addition, the audio output unit 1003 may further provide audio output (for example, calling signal receiving sound or message receiving sound) related to a specific function performed by the communications device 1000. The audio output unit 1003 includes a loudspeaker, a buzzer, a telephone receiver, and the like.

The input unit 1004 is configured to receive an audio or video signal. The input unit 1004 may include a graphics processing unit (Graphics Processing Unit, GPU) 10041 and a microphone 10042. The graphics processing unit 10041 processes image data of a static image or video obtained by an image capture apparatus (such as, a camera) in a video capture mode or an image capture mode. A processed image frame may be displayed on the display unit 1006. The image frame processed by the graphics processing unit 10041 may be stored in the memory 1009 (or another storage medium) or sent by using the radio frequency unit 1001 or the network module 1002. The microphone 10042 may receive sound and process such sound into audio data. The processed audio data may be converted in a telephone call mode into a format that can be sent by the radio frequency unit 1001 to a mobile communications base station for output.

The communications device 1000 further includes at least one sensor 1005 such as an optical sensor, a motion sensor, and another sensor. Specifically, the optical sensor includes an ambient light sensor and a proximity sensor. The ambient light sensor may adjust luminance of the display panel 10061 based on brightness of ambient light, and the proximity sensor may disable the display panel 10061 and/or back light when the communications device 1000 approaches an ear. As a type of the motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 1005 may further include a fingerprint sensor, a pressure sensor, an iris sensor, a molecule sensor, a gyroscope, a barometer, a hygrometer, a thermometer, and an infrared sensor. Details are not described herein.

The display unit 1006 is configured to display information input by a user or information provided for a user. The display unit 1006 may include a display panel 10061. The display panel 10061 may be configured in a form such as a liquid crystal display (Liquid Crystal Display, LCD) and an organic light-emitting diode (Organic Light-Emitting Diode, OLED).

The user input unit 1007 may be configured to receive input digit or character information and generate key signal input related to user setting and function control of the terminal. Specifically, the user input unit 1007 includes a touch panel 10071 and another input device 10072. The touch panel 10071 is also referred to as a touchscreen, and may collect a touch operation performed by the user on or near the touch panel 10071 (such as an operation performed by the user on the touch panel 10071 or near the touch panel 10071 by using any proper object or accessory such as a finger or a stylus). The touch panel 10071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 1010, and receives and executes a command sent by the processor 1010. In addition, the touch panel 10071 may be implemented by using a plurality of types such as a resistive type, a capacitive type, an infrared ray, and a surface acoustic wave. The user input unit 1007 may include the another input device 10072 in addition to the touch panel 10071. Specifically, the another input device 10072 may include but is not limited to a physical keyboard, a function key (such as a volume control key or a power on/off key), a trackball, a mouse, and a joystick. Details are not described herein again.

Further, the touch panel 10071 may cover the display panel 10061. After detecting a touch operation on or near the touch panel 10071, the touch panel 10071 transfers the touch operation to the processor 1010 to determine a type of a touch event. Then the processor 1010 provides corresponding visual output on the display panel 10061 based on the type of the touch event. In FIG. 10, the touch panel 10071 and the display panel 10061 are used as two independent components to implement input and output functions of the terminal. However, in some embodiments, the touch panel 10071 and the display panel 10061 may be integrated to implement the input and output functions of the terminal. This is not specifically limited herein.

The interface unit 1008 is an interface for connecting an external apparatus and the communications device 1000. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 1008 may be configured to receive input (such as data information or electric power) from the external apparatus and transmit the received input to one or more elements in the communications device 1000 or may be configured to transmit data between the communications device 1000 and the external apparatus.

The memory 1009 may be configured to store a software program and various data. The memory 1009 may mainly include a program storage area and a data storage area. The program storage area may store an operating system, an application program required by at least one function (such as a voice playing function and an image playing function), and the like, and the data storage area may store data (such as audio data and a phone book) created based on use of the mobile phone, and the like. In addition, the memory 1009 may include a high-speed random access memory, and may further include a nonvolatile memory, such as at least one magnetic disk storage component, a flash memory component, or another volatile solid-state storage component.

The processor 1010 is a control center of the communications device, and connects to various parts of the entire terminal by using various interfaces and lines. Various functions of the terminal and data processing are performed by running or executing a software program and/or a module stored in the memory 1009 and by invoking data stored in the memory 1009, to perform overall monitoring on the terminal. The processor 1010 may include one or more processing units. Optionally, the processor 1010 may integrate an application processor and a modem processor, where the application processor mainly processes an operating system, a user interface, an application program, or the like, and the modem processor mainly processes radio communications. It may be understood that the modem processor may not be integrated into the processor 1010.

The communications device 1000 may further include the power supply 1011 (such as a battery) that supplies power to all the components. Optionally, the power supply 1011 may be logically connected to the processor 1010 by using a power management system, to implement functions such as charging and discharging management and power consumption management by using the power management system.

In addition, the communications device 1000 may further include some function modules that are not shown. Details are not described herein.

In addition, FIG. 11 is a schematic diagram of a hardware structure of a communications device for implementing various embodiments of the present disclosure. A communications device 110 includes but is not limited to a bus 111, a transceiver 112, an antenna 113, a bus interface 114, a processor 115, and a memory 116.

In this embodiment of the present disclosure, the communications device 110 further includes a computer program that is stored on the memory 116 and can run on the processor 115. When the communications device 110 is a receive end, when the computer program is executed by the processor 115, the following steps are implemented:

obtaining a duplication detection parameter, and performing duplication detection on a received sidelink PDCP PDU by using the duplication detection parameter.

When the communications device 110 is a transmit end, when the computer program is executed by the processor 115, the following step is implemented:

controlling the transceiver 112 to send, to a receive end, information used by the receive end to obtain a duplication detection parameter, where the duplication detection parameter is used by the receive end to perform duplication detection on a received sidelink PDCP PDU.

The transceiver 112 is configured to receive and send data under control of the processor 115.

In FIG. 11, for a bus architecture (represented by the bus 111), the bus 111 may include any quantity of interconnecting buses and bridges, and the bus 111 interconnects various circuits of one or more processors represented by the processor 115 and a memory represented by the memory 116. The bus 111 may further link together various other circuits, such as a peripheral device, a voltage regulator, and a power management circuit. These are all well known in the art. Therefore, this specification provides no further description. The bus interface 114 provides an interface between the bus 111 and the transceiver 112. The transceiver 112 may be one or more elements, for example, a plurality of receivers and transmitters, and provides a unit that is configured to communicate with various other apparatuses on a transmission medium. Data processed by the processor 115 is transmitted on a wireless medium by using the antenna 113. The antenna 113 further receives data and transmits the data to the processor 115.

The processor 115 is responsible for managing the bus 111 and general processing, and may further provide various functions, including timing, peripheral interfacing, voltage regulation, power management, and another control function. The memory 116 may be configured to store data used by the processor 115 when performing an operation.

Optionally, the processor 115 may be a CPU, an ASIC, an FPGA, or a CPLD.

An embodiment of the present disclosure further provides a computer readable storage medium, and the computer readable storage medium stores a program. When the program is executed by a processor, processes in the embodiment of the foregoing receiving method or processes in the embodiment of the foregoing sending method are implemented, and the same technical effects can be achieved. To avoid repetition, details are not described herein again. The computer readable storage medium is, for example, a read-only memory (Read-Only Memory, ROM for short), a random access memory (Random Access Memory, RAM for short), a magnetic disk, or an optical disc.

It should be noted that, the terms "comprise", "include", or their any other variant in this specification are intended to cover a non-exclusive inclusion, so that a process, a method, an object, or an apparatus that includes a list of elements not only includes those elements but also includes other elements which are not expressly listed, or further includes elements inherent to such process, method, object, or apparatus. An element preceded by "including a . . . " does not, without more constraints, preclude the existence of additional identical elements in the process, method, object, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The software product is stored in a readable storage medium (such as a ROM/RAM, an optical disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

What is claimed is:

1. A receiving method operable by a receive end, comprising: obtaining a duplication detection parameter; and performing duplication detection on a received sidelink packet data convergence protocol (PDCP} protocol data unit (PDU) by using the duplication detection parameter; the duplication detection parameter comprises a sequence number length parameter and a receive window length parameter of a first receive window; and the performing duplication detection on a received sidelink PDCP PDU by using the duplication detection parameter is:

Comparing a first sequence number (SN) to each of a second SN, a third SN, and a difference between the third SN and the receive window length parameter of a first receive window;
   in response to the first sequence number (SN) being greater than the second SN and being less than the third SN, and the PDCP service data unit (SDU) corresponding to the received sidelink PDCP PDU being buffered, or in response to the first SN being less than the second SN and being greater than or equal to the difference between the third SN and the receive window length parameter, discarding the received sidelink PDCP PDU; or in response to the first SN not being greater than the second SN and not being less than the third SN, and the PDCP SDU corresponding to the received sidelink PDCP PDU not being buffered, or in response to the first SN not being less than the second SN and not being greater than or equal to the difference between the third SN and the receive window length parameter, buffering the PDCP SDU corresponding to the received sidelink PDCP PDU, wherein the first SN is an SN of the received sidelink PDCP PDU, the second SN is a minimum value of an SN of a PDCP PDU that has not been received before the PDCP PDU is received, and the third SN is a sum of 1 and a maximum value of an SN of a PDCP PDU that has been received before the PDCP PDU is received; wherein the obtaining a duplication detection parameter comprises: obtaining, by using a first correspondence between a service attribute parameter and the duplication detection parameter, a duplication detection parameter corresponding to a service attribute of a target service, wherein the target service is a service carried by the received sidelink PDCP PDU, wherein the service attribute parameter comprises Proximity-based Services Per-Packet Priority (PPPP) values, and each value of the sequence number length parameters and the receive window length parameters corresponds to a different PPPP value; wherein the method further comprises: receiving the first correspondence sent by the transmit end.

2. The receiving method according to claim 1, wherein the service attribute parameter further comprises at least one of the following parameters: a ProSe per-packet reliability (PPPR) parameter, or a sidelink radio bearer (SLRB) identifier parameter.

3. The receiving method according to claim 1, wherein the obtaining the duplication detection parameter carried in a message sent by a transmit end is: obtaining the duplication detection parameter carried in a message sent by the transmit end by using a sidelink channel; or obtaining the duplication detection parameter carried in a message sent by the transmit end by using a sidelink broadcast channel.

4. A communications device, comprising: comprising a processor, a memory, and a program that is stored in the memory and can run on the processor, wherein the processor executes the program to: obtain a duplication detection parameter; and perform duplication detection on a received packet data convergence protocol (PDCP) protocol data unit (PDU) by using the duplication detection parameter; the duplication detection parameter comprises a sequence number length parameter and a receive window length parameter of a first receive window, and the processor executes the program to: in response to a first sequence number (SN) [being greater than a second SN and being less than a third SN, and the PDCP service data unit (SDU} corresponding to the received sidelink PDCP PDU being buffered, or in response to the first SN being less than the second SN and being greater than or equal to a difference between the third SN and a first receive window size, discard the received sidelink PDCP PDU; or in response to a first SN not being greater than a second SN and not being less than a third SN, and the PDCP SDU corresponding to the received sidelink PDCP PDU not being buffered, or in response to the first SN not being less than the second SN and not being greater than or equal to a difference between the third SN and a first receive window size, buffer the PDCP SDU corresponding to the received sidelink PDCP PDU, wherein the first SN is an SN of the received sidelink PDCP PDU, the second SN is a minimum value of an SN of a PDCP PDU that has not been received before the PDCP PDU is received, and the third SN is a sum of 1 and a maximum value of an SN of a PDCP PDU that has been received before the PDCP PDU is received; wherein the processor executes the program to: obtain, by using a first correspondence between a service attribute parameter and the duplication detection parameter, a duplication detection parameter corresponding to a service attribute of a target service, wherein the target service is a service carried by the received sidelink PDCP PDU, wherein the service attribute parameter comprises Proximity-based Services Per-Packet Priority (PPPP) values and each value of the sequence number length parameters and the receive window length parameters corresponds to a different PPPP value; wherein the processor executes the program to: receive the first correspondence sent by the transmit end.

5. The communications device according to claim 4, wherein the service attribute parameter further comprises at least one of the following parameters: a ProSe per-packet reliability (PPPR) parameter, or a sidelink radio bearer (SLRB) identifier parameter.

6. The communications device according to claim 4, wherein the processor executes the program to: obtain the duplication detection parameter carried in a message sent by the transmit end by using a sidelink channel; or obtain the duplication detection parameter carried in a message sent by the transmit end by using a sidelink broadcast channel.

* * * * *